United States Patent [19]
Kato

[11] Patent Number: 5,822,988
[45] Date of Patent: Oct. 20, 1998

[54] FLOW CONTROL DEVICE OF A POWER STEERING APPARATUS

[75] Inventor: Hideya Kato, Okazaki, Japan

[73] Assignee: Toyoda Koki Kabushiki Kaisha, Kariya, Japan

[21] Appl. No.: 875,110

[22] PCT Filed: Nov. 22, 1996

[86] PCT No.: PCT/JP96/03438

§ 371 Date: Jul. 24, 1997

§ 102(e) Date: Jul. 24, 1997

[87] PCT Pub. No.: WO97/18983

PCT Pub. Date: May 29, 1997

[30] Foreign Application Priority Data

Nov. 24, 1995 [JP] Japan .................................. 7-305284

[51] Int. Cl.$^6$ ............................................. F16D 31/02
[52] U.S. Cl. ................................................ 60/468; 91/446
[58] Field of Search ........................ 60/468; 91/375 R, 91/375 A, 434, 446

[56] References Cited

U.S. PATENT DOCUMENTS

| | | | |
|---|---|---|---|
| 2,981,067 | 4/1961 | Clark et al. ............................ | 60/468 |
| 4,020,867 | 5/1977 | Sumiyoshi ............................. | 91/446 |
| 5,170,626 | 12/1992 | Ohtaki et al. ......................... | 60/468 |
| 5,471,838 | 12/1995 | Suzuki et al. ......................... | 91/375 R |
| 5,685,146 | 11/1997 | Takeuchi et al. .................... | 91/375 R |

*Primary Examiner*—F. Daniel Lopez
*Attorney, Agent, or Firm*—Oblon, Spivak, McClelland, Maier & Neustadt, P.C.

[57] ABSTRACT

In a flow control device for vehicles and like, a union 17 of a pump receives a load pressure responsive valve 24. The union 17 is provided with outlet port to supply operating fluid regulated by a flow control valve to a control valve. The load pressure responsive valve, received in the union, has a variable orifice. The load pressure responsive valve brings the spring chamber into communication with the reservoir when road pressure, caused by operation of a steering wheel, is relatively low and the load pressure responsive valve shuts the communication between the spring chamber and the reservoir in response to rising of the road pressure. Therefore, the flow control device provides the power saving caused by decreasing the flow rate supplied from the pump to the control valve at low load pressure without substantial improvement of a pump housing.

2 Claims, 4 Drawing Sheets

FLOW CONTROL DEVICE OF A POWER STEERING APPARATUS

BACKGROUND OF THE INVENTION

Field of the Invention

The present invention relates to a flow control device of a power steering apparatus suitable for use in vehicles and like. More particularly, the present invention relates to a flow control device of a power steering apparatus which is capable of energy saving by decreasing the flow rate supplied from a pump to a control valve at low load pressure.

Background of the invention

Flow control devices of power steering apparatuses have been proposed for energy saving of vehicle engine by decreasing the flow rate supplied from a pump to a control valve at low road pressure when a steering wheel is not rotated. Examples of the flow control device are shown in the Japanese Unexamined Patent Publication No. 6-8840, the U.S. Pat. No. 5,439,070 and the German Laid-open Publication Patent No. 43 19 495 A1. The above flow control device contains a load pressure responsive valve (hereinafter referred to as a responsive valve) with a variable orifice which is responsive to the road pressure. It is possible for the flow control device to reduce the energy consumption because the variable orifice releases pressure in a spring chamber of the flow control valve to low pressure side in order to reduce the flow rate supplied to a control valve when the road pressure is relatively low.

However, the flow control device for energy saving involves some drawbacks. Namely a normal pump housing can not be applied to the pump with the responsive valve for energy saving. Because the pump housing for energy saving needs a special bore receiving the responsive valve for decreasing the flow rate supplied to the control valve, besides a normal bore receiving the flow control valve for controlling operating fluid to supply to control valve. As a result, since the pump housing for energy saving is different from the normal pump housing, the cost of the flow control device for energy saving is relatively high.

Accordingly, it is an object of the present invention to provide an improved flow control device, a pump housing of which can be made up of a normal pump housing as a common housing between a normal pump without the responsive valve and a pump with it.

SUMMARY OF THE INVENTION

The present invention has been accomplished to solve the above mentioned problem. Briefly, the flow control device of a power steering apparatus comprises a control valve, a pump, a power cylinder, a metering orifice, a flow control valve, a valve receiving bore, a union, and a load pressure responsive valve.

The control valve has variable throttles arranged on paths connected to the pump, both fluid chambers of the power cylinder and the reservoir. The metering orifice is arranged in a supply passage leading operating fluid discharged from the pump to the control valve. The flow control valve has the metering orifice, a spring chamber connected to the supply passage downstream of the metering orifice, and a bypass spool urged by a spring in the spring chamber so as to regulate an opening of a bypass passage in accordance with the pressure difference across the metering orifice. The valve receiving bore slidably receives the bypass spool in a housing of the pump. The union, arranged in the valve receiving bore, has the metering orifice at a first end of it and an outlet port leading operating fluid passed through the metering orifice at a second end. The load pressure responsive valve, received in the union, has a variable orifice. The load pressure responsive valve brings the spring chamber into communication with the reservoir when road pressure, caused by operation of a steering wheel, is relatively low and the load pressure responsive valve shuts the communication between the spring chamber and the reservoir in response to rising of the road pressure.

With the above configuration, in the situation where the load pressure is relatively low when the steering wheel is in its neutral position, the variable orifice of the load pressure responsive valve received in the union is open, then pressure in the spring chamber is reduced by release of the pressure from the spring chamber to the reservoir through the variable orifice. Therefore, the operating fluid from the pump is bypassed to the reservoir much more, whereby the flow rate of the operating fluid supplied to the control valve is decreased. As a result, the energy consumption of the pump is reduced.

When the steering wheel is turned, the pressure on the supply passage at the upstream of the control valve (hereinafter referred to as load pressure) gradually increases, and opening area of the variable orifice gradually diminished by the operation of the load pressure responsive valve.

As the load pressure further increases, the opening area of the variable orifice is completely closed. Therefore, the flow rate supplied to the control valve is increased, so that the assistance force of the power steering apparatus is generated.

BRIEF DESCRIPTION OF THE ACCOMPANYING DRAWINGS

FIG. 1 is an overall structure of a flow control device of a power steering apparatus of an embodiment of the invention.

FIG. 2 is an enlarged sectional view of a portion B showing details of the flow control device in FIG. 1. FIG. 3 is a partial greatly enlarged view of FIG. 2. FIG. 4 is a graph showing a relationship between a load pressure and a flow rate of operating fluid supplied to a control valve.

DESCRIPTION OF THE PREFERRED EMBODIMENTS

An embodiment of the present invention will now be described with reference to the accompanying drawings.

Figure 1:
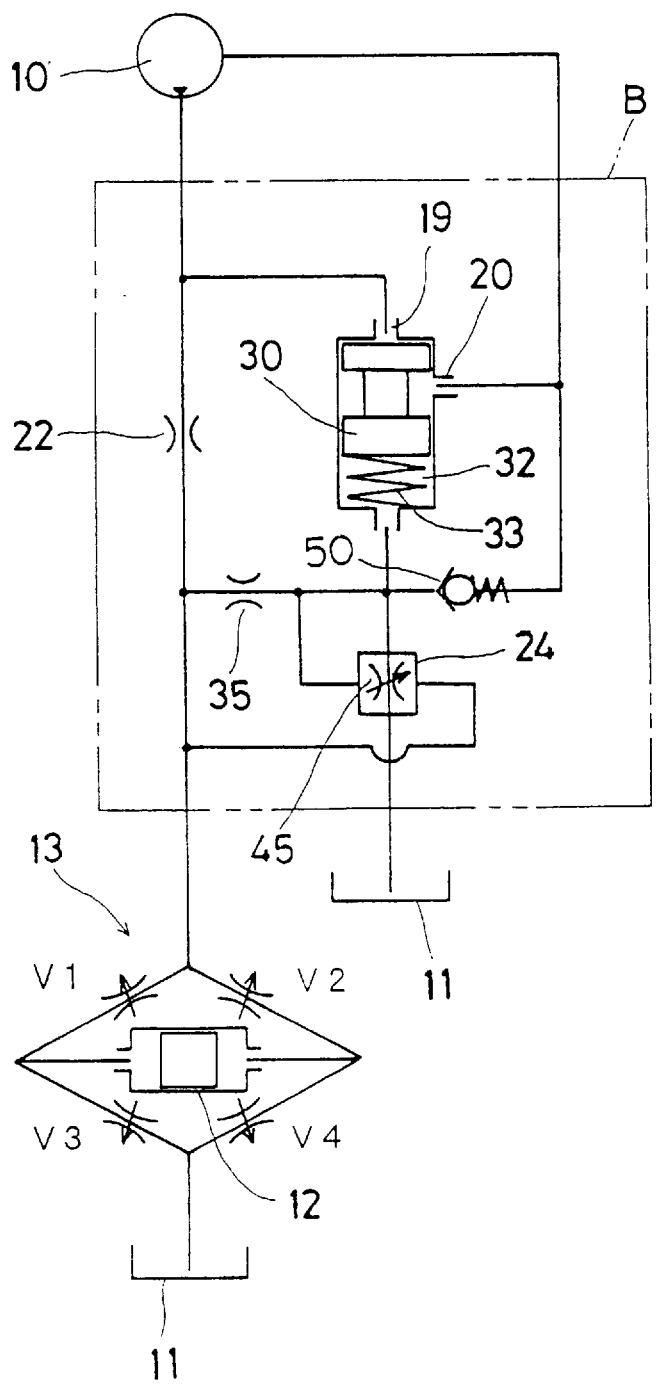

FIG. 1 is an overall structure of a hydraulic power steering apparatus according to the present invention. It is mainly composed of a pump 10 driven by an automotive engine not shown, a reservoir 11, a power cylinder 12 to assist the steering wheel operation, a rotary control valve 13 to control the flow rate of operating fluid discharged from the pump 10 to the power cylinder 12 in accordance with rotation of a steering wheel.

Figure 2:
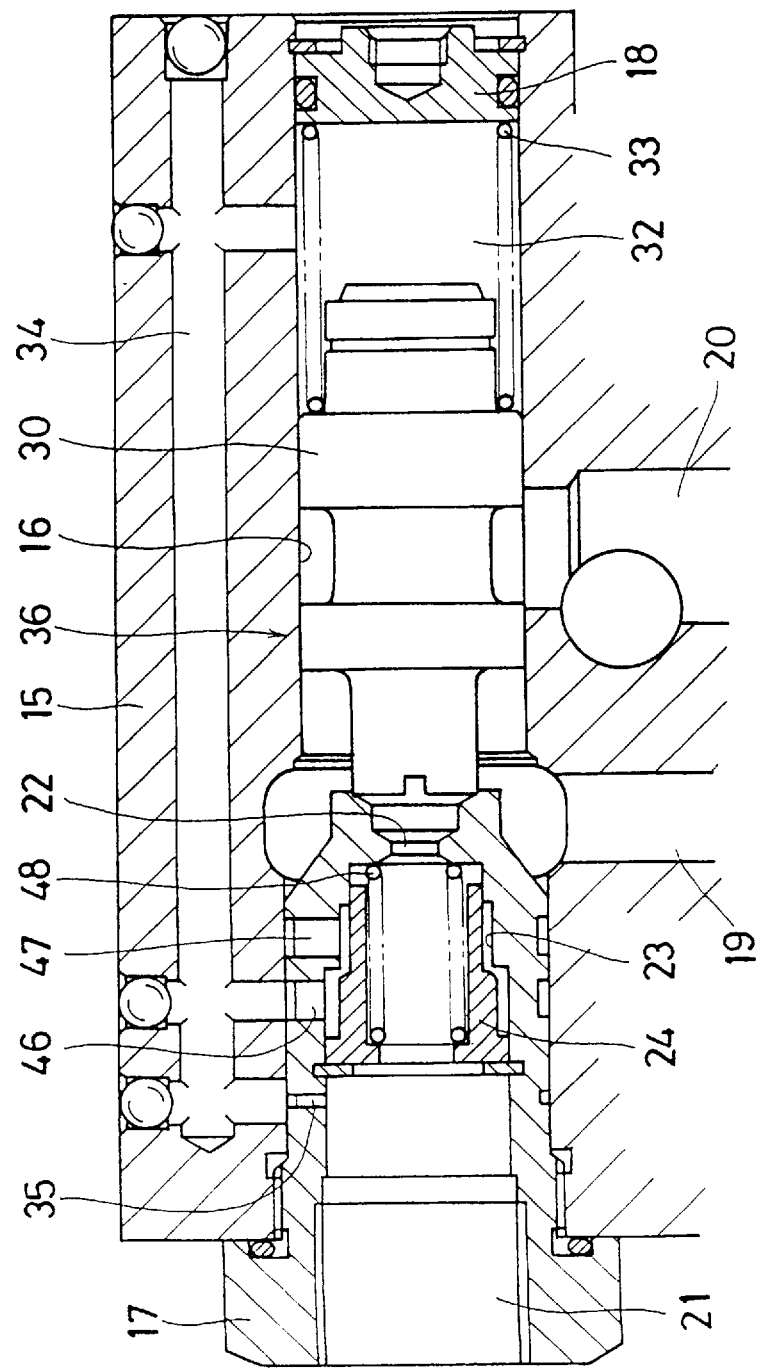

As shown in FIG. 2, a valve receiving bore 16 is formed in a pump housing 15 of the pump 10. A union 17 is screwed in one end of the valve receiving bore 16 with a seal, and a stop cap 18 is choked in the other end. A supply passage 19 and a bypass passage 20 are formed separately to connect to the valve receiving bore 16 in axial direction thereof. The supply passage 19 is connected to a discharged port of the pump 10. The bypass passage 20 is connected to a suction port of the pump 10.

Figure 3:
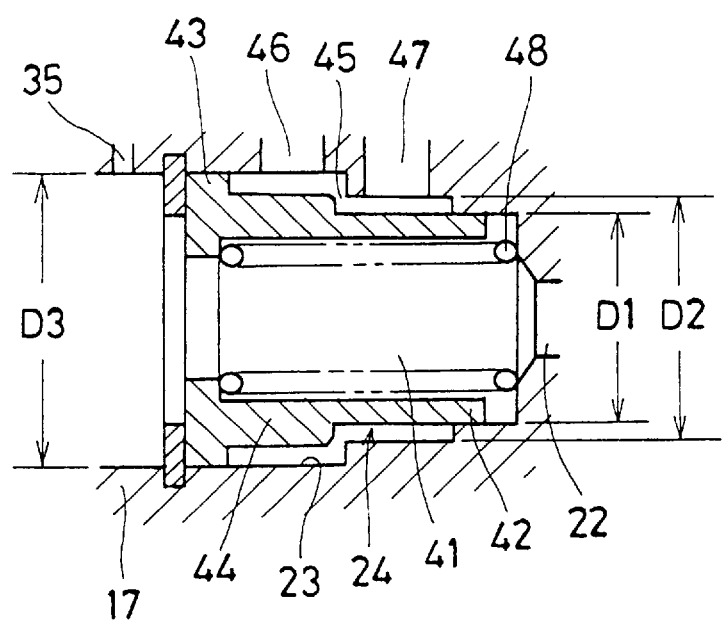

In each end of the union 17, an outlet port 21 and a metering orifice 22 are formed, respectively. The outlet port 21 is connected to an inlet port of the control valve 13. The metering orifice 22 is connected to the supply passage 19. In the union 17, a stepped bore 23 is formed between the outlet port 21 and the metering orifice 22. As shown in FIG. 3, the stepped bore 23 contains a small diameter bore with a diameter of D1, a middle diameter bore with a diameter of D2, and a large diameter bore with a diameter of D3 in this order from the metering orifice 22 (D1<D2<D3). In the stepped bore 23, a load pressure responsive valve 24 (hereinafter referred to as a responsive valve 24) is slidably received within a certain stroke of distance.

A bypass spool 30 is slidably received in the valve receiving bore 16 to control flow rate of operating fluid supplied to the control valve 13. A spring chamber 32 is formed between one end of the bypass spool 30 and the stop cap 18 in the valve receiving bore 16. The spring chamber 32 contains a spring 33 which urges the bypass spool 30 toward the union 17 to close an opening area of the bypass passage 20, whereby the communication between the supply passage 19 and the bypass passage 20 is regulated.

In the pump housing 15, a connection passage 34 is formed between the spring chamber 32 and the outlet port 21 to be communicated with each other through a control orifice 35 bored in the union 17. In the above-mentioned construction, differential pressure across the metering orifice 22 acts on both opposite ends of the bypass spool 30, as the pressure before the metering orifice 22 acts on the left end and the pressure passed through it acts on the right end. The bypass spool 30 adjusts an opening area of the bypass passage 20 to maintain the differential pressure across the metering orifice 22 constant. The metering orifice 22, the bypass spool 30 and the spring 33 constitute a flow control valve 36.

In the responsive valve 24 received in the union 17, a penetration bore 41 is formed to be communicated between the metering orifice 22 and the outlet port 21. The responsive valve 24 contains a small diameter portion 42 with a small diameter formed at one end toward the metering orifice 22, and a large diameter portion 43 with a larger diameter formed at the other end toward the outlet port 21. A middle diameter portion 44 is formed at the middle of the responsive valve 24 and has a middle size of the diameter between the small diameter portion 42 and the large diameter portion 43. The small diameter bore and the large diameter bore of the stepped bore 23 slidably receives the small diameter portion 42 and the large diameter portion 43, respectively. Therefore, a shoulder of the middle diameter portion 44 is possible to move and contact with a shoulder of the middle diameter bore, that forms a variable orifice 45 between the shoulders.

In the union 17, a pressure introduction port 46 is formed where it faces the middle diameter portion 44 of the responsive valve 24 and is connected to the connection passage 34. And in the union 17, a pressure exhaust port 47 is formed where it faces the small diameter portion 42 of the responsive valve 24 and is connected to the reservoir 11. Therefore, the pressure introduction port 46 and the pressure exhaust port 47 are possible to communicate with each other through the variable orifice 45.

A spring 48 between the responsive valve 24 and the union 17 urges the responsive valve 24 toward the large diameter portion 43. In the normal situation as shown in FIG. 3, since the responsive valve 24 is maintained to its sliding end by the spring 48, the variable orifice 45 is completely open, and the pressure introduction port 46 and the pressure exhaust port 47 maintain the communication with each other.

In this state, the operating fluid has passed through the metering orifice 22 is supplied to the spring chamber 32 through the control orifice 35 and the connection passage 34. At the same time, the operating fluid is drained to the reservoir 11 through the pressure introduction port 46 and the pressure exhaust port 47. Therefore, the responsive valve 24 is acted by two opposite hydraulic propulsion. One is a rightward hydraulic propulsion caused by pressure Pb of operating fluid before the control orifice 35, the other is a leftward hydraulic propulsion caused by pressure Pa of operating fluid passed through the control orifice 35.

Here, a pressure receiving area A1 acted by the rightward hydraulic propulsion to move the responsive valve 24 rightward and a pressure receiving area A2 by the leftward hydraulic propulsion to move it leftward can be expressed by the following formulas.

$$A1=(\pi/4)\times(D3^2-D1^2)$$

$$A2=(\pi/4)\times(D3^2-D2^2)$$

Therefore, a formula for a force F1 which urges the responsive valve 24 rightward is F1=A1×Pb, and for a force F2 urges it leftward is F2=A2×Pa+Fs. Here, Fs shows spring force of the spring 48.

On condition that the load pressure is relatively low, since difference of the hydraulic propulsions acted on the both ends of the responsive valve 24 is small and a force of the spring 48 acts leftward, the following relationship is established.

$$F1(=A1\times Pb)<F2(=A2\times Pa+Fs)$$

However, on condition that the load pressure increase, since the difference of the hydraulic propulsions is increased, the above relationship changes to F1>F2. Therefore, the responsive valve 24 is moved rightward against the spring force of the spring 48, thereby decreasing the opening area of the variable orifice 45.

FIG. 1 shows a schematic illustration of the well-known control valve. The control valve 13 contains four variable throttles V1, V2, V3 and V4 of center-open type disposed in the fluid paths respectively connected to the pump 10, both fluid chambers of the power cylinder 12 and the reservoir 11, respectively.

Numeral 50 in FIG. 1 denotes a relief valve incorporated into the bypass spool 30. The relief valve 50 releases the pressure in the spring chamber 32 to the bypass passage 20 when the pressure in the spring chamber 32 exceeds a preset pressure.

The operation of the flow control device as constructed above will now be described. When the pump 10 is driven by the automotive engine, the operating fluid is supplied from the discharged port of the pump 10 to the supply passage 19.

The operating fluid discharged to the supply passage 19 is then supplied from the outlet port 21 of the union 17 to the control valve 13 through the metering orifice 22. At the same time, the operating fluid which has passed through the metering orifice 22 is introduced into the spring chamber 32 and the pressure introduction port 46 from the control orifice 35 through the connection passage 34. Therefore, the differential pressure across the metering orifice 22 acts on both opposite ends of the bypass spool 30. The operating area of the bypass passage 20 is adjusted to maintain the differential pressure constant, thereby maintaining the flow rate supplied from pump 10 to the control valve 13 constant.

Figure 4:
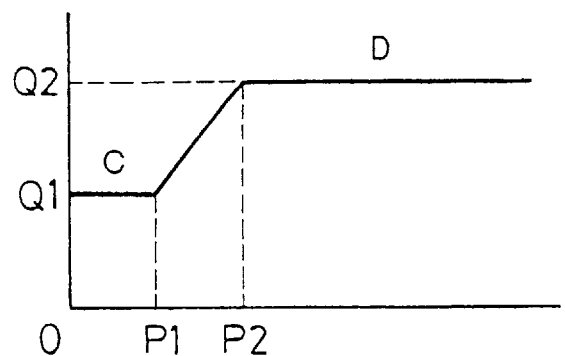

When the steering wheel not shown is in its neutral state, the operating fluid supplied to the control valve 13 is equally drained from the variable throttles V1 and V2 to the reservoir 11 through the variable throttles V3 and V4. Therefore, the pressure in each chamber of the power cylinder 12 is equally maintained low. On this condition, since the load pressure is relatively low, the difference of hydraulic propulsions act on the both ends of the responsive valve 24 is small. Therefore, the responsive valve 24 is maintained to its left sliding end at a side of the large diameter portion 43 by the spring 48. Under this condition, the variable orifice 45 is completely open, and the pressure introduction port 46 and the pressure exhaust port 47 maintain the communication with each other, the pressure in the spring chamber 32 is released to the low-pressure side of the reservoir 11 through the variable orifice 45. Therefore, since the pressure in the spring chamber 32 is lowered by pilot fluid rate released from the spring chamber 32 to the low pressure side, the bypass spool 30 is displaced rightward to open the bypass passage 20 much more. Accordingly, the operating fluid discharged from the pump 10 is mostly bypassed to the suction port of the pump 10. With this operation, the flow rate of the operating fluid supplied to the control valve 13 is reduced to the lowest flow rate Q1, as shown in C of FIG. 4. Therefore, the energy consumed by the pump 10 is reduced.

According as the steering wheel 13 is rotated, one pair of variable throttles V1, V3 and V2, V4 is gradually open and the other pair simultaneously close in accordance with the rotational direction thereof, whereby the load pressure is increased. This causes the differential pressure between both the chambers of the power cylinder 12 to generate an assistance force of the power steering apparatus.

When the load pressure increases to a pressure P1, the difference of hydraulic propulsions between both ends of the responsive valve 24 is increased in accord with the difference of the both the pressure receiving area A1 and A2. And when the difference of hydraulic propulsions exceeds the force of the spring 48, the responsive valve 24 is moved rightward against the spring 48, thereby decreasing the opening area of the variable orifice 45 between the pressure introduction port 46 and the pressure exhaust port 47, and finally to close the opening area. Therefore, since the pilot fluid rate released from the spring chamber 32 to the low pressure side is decreased to zero, the pressure in the spring chamber 32 increases so that the bypass spool 30 is moved to close the bypass passage 20. As the result, the flow rate of the operating fluid supplied to the control valve 13 increases to the maximum rate Q2, as shown in D of FIG. 4, to generate a sufficient assistance force of the power steering apparatus.

In the above-described embodiment, since the flow control device contains the load pressure responsive valve 24 received in the union 17, it is possible to provide for the flow control device for energy saving without substantial improvement of a normal pump housing. Namely, the normal pump housing is possible to be applied as their common housing to the pump with the load pressure responsive valve 24 for energy saving in only addition of manufacturing the pressure introduction port 46 and the pressure exhaust port 47.

Further in the above-described embodiment, since the responsive valve 24 has the different pressure receiving areas between two opposite ends thereof, a spring with a small spring constant can be used for the spring 48 even when the load pressure responsive valve 24 is controlled within a short distance, and therefore, dispersion of the axial position of the spring 48 can be reduced. As a result, the flow rate is possible to be controlled accurately.

Industrial applicability:

As described above, since the flow control device relative to the invention has the load pressure responsive valve received in the union, the energy saving, caused by decreasing the flow rate supplied from the pump to the control valve at low load pressure, is accomplished without substantial improvement of a normal pump housing.

What is claimed is:

1. A flow control device of a power steering apparatus comprising:

a control valve having variable throttles arranged on paths connected to a pump, both fluid chambers of a power cylinder and a reservoir;

a metering orifice arranged in a supply passage leading operating fluid discharged from said pump to said control valve;

a flow control valve having said metering orifice, a spring chamber connected to said supply passage downstream of said metering orifice, and a bypass spool urged by a spring in said spring chamber so as to regulate an opening of a bypass passage in accordance with the pressure difference across said metering orifice;

a valve receiving bore (16) which slidably receives said bypass spool in a housing of said pump;

a union (17), arranged in said valve receiving bore (16), having said metering orifice at a first end of it and an outlet port leading operating fluid passed through said metering orifice at a second end;

a load pressure responsive valve (24) received in said union (17) and having a variable orifice (45), said load pressure responsive valve (24) brings said spring chamber into communication with said reservoir when road pressure, caused by operation of a steering wheel, is relatively low and said load pressure responsive valve (24) shuts the communication between said spring chamber and said reservoir in response to rising of the road pressure.

2. A flow control device of a power steering apparatus according to claim 1, wherein said load pressure responsive valve (24) has a difference between a first area at one end portion of and a second area at another end portion of said load pressure responsive valve, and said load pressure responsive valve is urged by a spring (48) toward the end portion having a larger area of said load pressure responsive valve.

* * * * *